US006651882B2

(12) United States Patent
Lane

(10) Patent No.: US 6,651,882 B2
(45) Date of Patent: Nov. 25, 2003

(54) CONCESSION SALES CALCULATOR

(76) Inventor: F. Keith Lane, 1877 Gualtney Rd., Banner Elk, NC (US) 28604

( * ) Notice: Subject to any disclaimer, the term of this patent is extended or adjusted under 35 U.S.C. 154(b) by 178 days.

(21) Appl. No.: 09/900,279

(22) Filed: Jul. 6, 2001

(65) Prior Publication Data

US 2003/0006278 A1 Jan. 9, 2003

(51) Int. Cl.[7] .......................... G06K 5/00; G06K 15/00
(52) U.S. Cl. ...................................... 235/380; 235/385
(58) Field of Search ........................... 235/462.49, 375, 235/472.01–472.03, 382, 380; 400/492, 490; 361/680, 686

(56) References Cited

U.S. PATENT DOCUMENTS 4,107,782 A 8/1978 Cochran
4,603,384 A 7/1986 Brantingham et al.
4,853,888 A 8/1989 Lata et al.
5,003,472 A 3/1991 Perrill et al.
5,579,487 A * 11/1996 Meyerson et al. .......... 710/100
5,630,664 A 5/1997 Farrelly
6,045,044 A * 4/2000 Coleman ............... 235/462.49
6,048,268 A * 4/2000 Humble ........................ 463/17
6,068,417 A * 5/2000 Butler ......................... 400/492

FOREIGN PATENT DOCUMENTS

DE 019638251 A1 * 3/1998

* cited by examiner

*Primary Examiner*—Thien M. Le
(74) *Attorney, Agent, or Firm*—Pitts & Brittian, P.C.

(57) ABSTRACT

A portable calculator for computation and display of transaction values for concessions sales between a vendor and a customer. The portable calculator includes a housing adapted to be hand held by an operator, having a keyboard with a plurality of keys thereon. The plurality of keys includes a first group representing a plurality of unit price values, a second group representing a plurality of tendered values, and a third group representing a plurality of quantity values. A math processor is in communication with the first group, second group, and third group of keys. A display on the housing displays at least one unit price value, a quantity value, a transaction value, a tendered value, and a change due value. The calculator requires a minimum of key strokes for computation and display of the transaction value and is versatile for use at different venues by untrained venders.

14 Claims, 4 Drawing Sheets

CONCESSION SALES CALCULATOR

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

1. Field of Invention

This invention relates generally to the field of concession sales tracking systems. More specifically, the present invention relates to an electronic concession sales calculator for entry of customer orders and computation of transaction value.

2. Description of the Related Art

Prior calculators have provided hand-held calculators with a plurality of keys displaying numbers and mathematical symbols for calculating mathematical values and solving scientific equations. Large counter top retail sales cash registers have provided keyboards with a plurality of keys displaying numbers, symbols, and/or types of items for summation of a retail order placed by a customer. Counter top cash registers are of limited mobility and may not be easily reprogrammed if the type of merchandise changes between events hosted at the venue, such as a sports event followed by a concert event.

Many concession stands are manned by volunteer groups having members who are not skilled in high volume, rapid response retail transactions common to entertainment events having short intermissions during which a majority of customers make purchases to avoid missing the main event. These volunteer concession operators are not accustomed to computing a transaction and making change and often need assistance in figuring the correct amounts. Additionally, for small vendor booths, space is limited and a vendor may prefer to maximize use of the booth space for display and storage of merchandise, and/or to reserve space for preparation of food orders. A counter top cash register may not be a preferred method of tracking concession sales due to the large size and lack of mobility of the cash register. For mobile individual vendors, whether volunteers or experienced sales vendors, a concessions sales calculator is needed that is hand-held, is quickly operated, and provides a visual summary of the customer's order and the amount tendered by the vendor. There is a need for a hand-held calculator that requires a minimum of key manipulations for computation and display of a merchandise sale, and which provides a display of the amount tendered and change due to a customer for rapid completion of a transaction by a vendor.

BRIEF SUMMARY OF THE INVENTION

In accordance with the present invention, there is provided a portable calculator for computation and display of an instantaneous transaction value between a vendor and a customer for concession sales. The portable calculator includes a hand held housing having a keyboard with a plurality of keys thereon. The plurality of keys are separated into at least a first group of keys, representing a plurality of unit price values, and a second group of keys representing a plurality of tendered values.

A means for computing includes a math processor in communication with the first group of keys and the second group of keys. The math processor requires at least one input from each of the first group of keys and the second group of keys to complete a transaction computation. The math processor includes a plurality of memory registers for storage of a plurality of unit price values and a plurality of tendered values associated with the respective keys of each group of keys manipulated by the operator.

At least one display is provided on the housing. The at least one display window is in communication with the math processor for display of a transaction value. The keyboard does not include additional function keys for addition, subtraction, multiplication, and/or division, due to automatic calculating functions associated with the math processor in communication with the respective keys for unit price values and for tendered values. Upon manipulation of the plurality of keys by the operator, the appropriate transaction value, tendered value summation, and "change due" value are displayed in the at least one display, for instantaneous verification to the vendor and the customer of a transaction value for each concession sale.

BRIEF DESCRIPTION OF THE SEVERAL VIEWS OF THE DRAWINGS

The present invention is illustrated in the drawings in which.

DETAILED DESCRIPTION OF THE INVENTION

Figure 1:
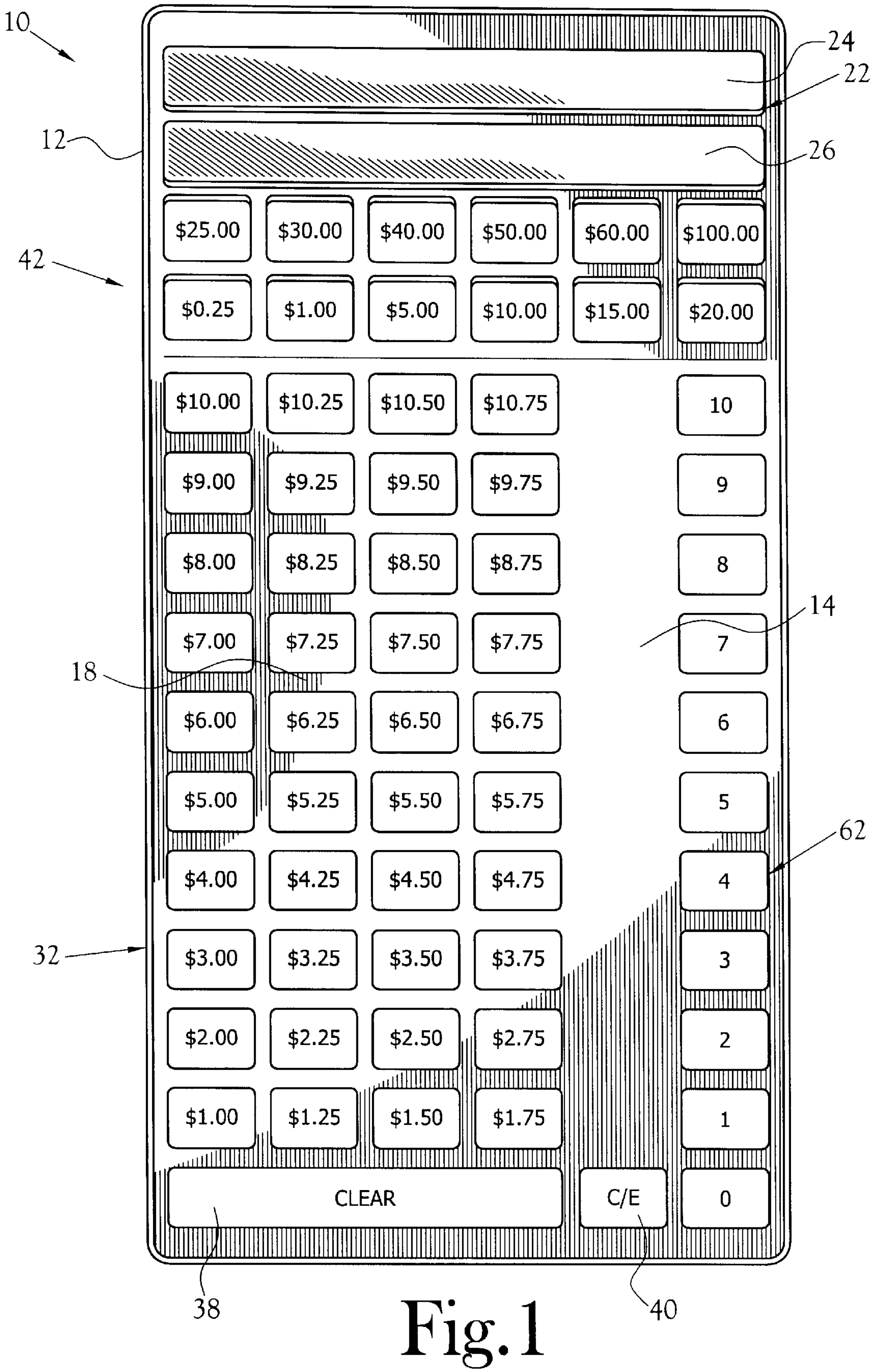
FIG. 1 is a front view of one embodiment of a calculator according to the present invention for computation and display of transaction values for concessions sales.
Figure 3:
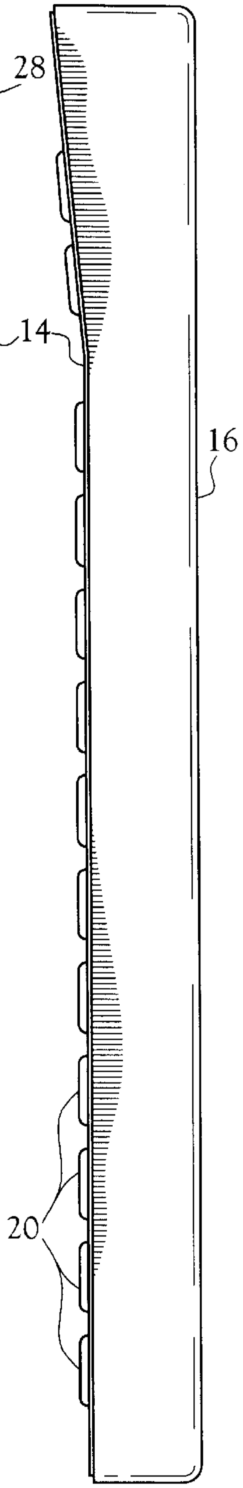
FIG. 3 is a side view of the alternative embodiment of the calculator.
Figure 5:
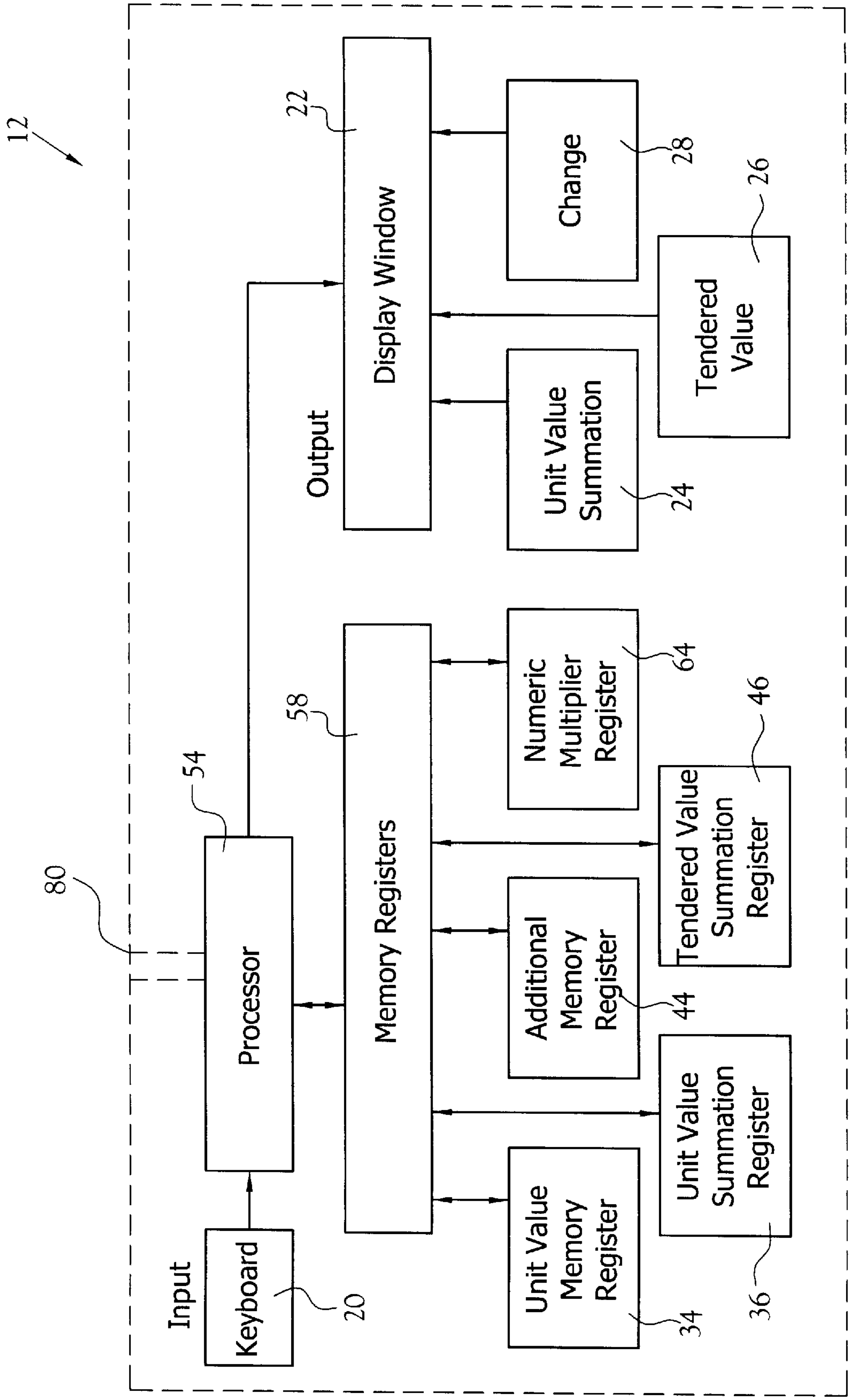
FIG. 5 is a schematic of a system for computation and display of transaction values according to the present invention.

A portable calculator for calculating of instantaneous transaction values for concessions sales is illustrated generally as a concessions calculator 10 in FIG. 1. The concessions calculator 10 includes a hand held housing 12 having a front surface 14 and a back surface 16 (see FIG. 3). The length, width, and depth of the housing 12 is sized to fit within one hand of a concessions vendor for use in a vendor booth, and is sized for ease of use by an operator moving through a standing or seated group of people. A keyboard 18 on the front surface 14 includes multiple groups of a plurality of keys 20 (see FIG. 3) thereon for data entry of a transaction value determined by a manipulation of one or more of the plurality of keys by the concessions vendor and/or operator. Within the housing 12 is a math processor unit 54 and associated memory registers 58 (see FIG. 5) for storage of a plurality of monetary values linked to each of the plurality of keys, and for computation of a transaction value for each concessions sale. The math processor unit 54 is powered by a replaceable power source known to those skilled in the art, such as at least one battery positioned within the housing 12. A schematic of a system for operating the concessions calculator 10 for computing and displaying transaction values is illustrated in FIG. 5.

The front surface 14 includes at least one display portion 22 (see FIG. 1) for illumination of an instantaneous record of the concessions transaction. The at least one display portion 22 includes a first display window 24 positioned above a second display window 26 as illustrated in FIG. 1.

Figure 2:
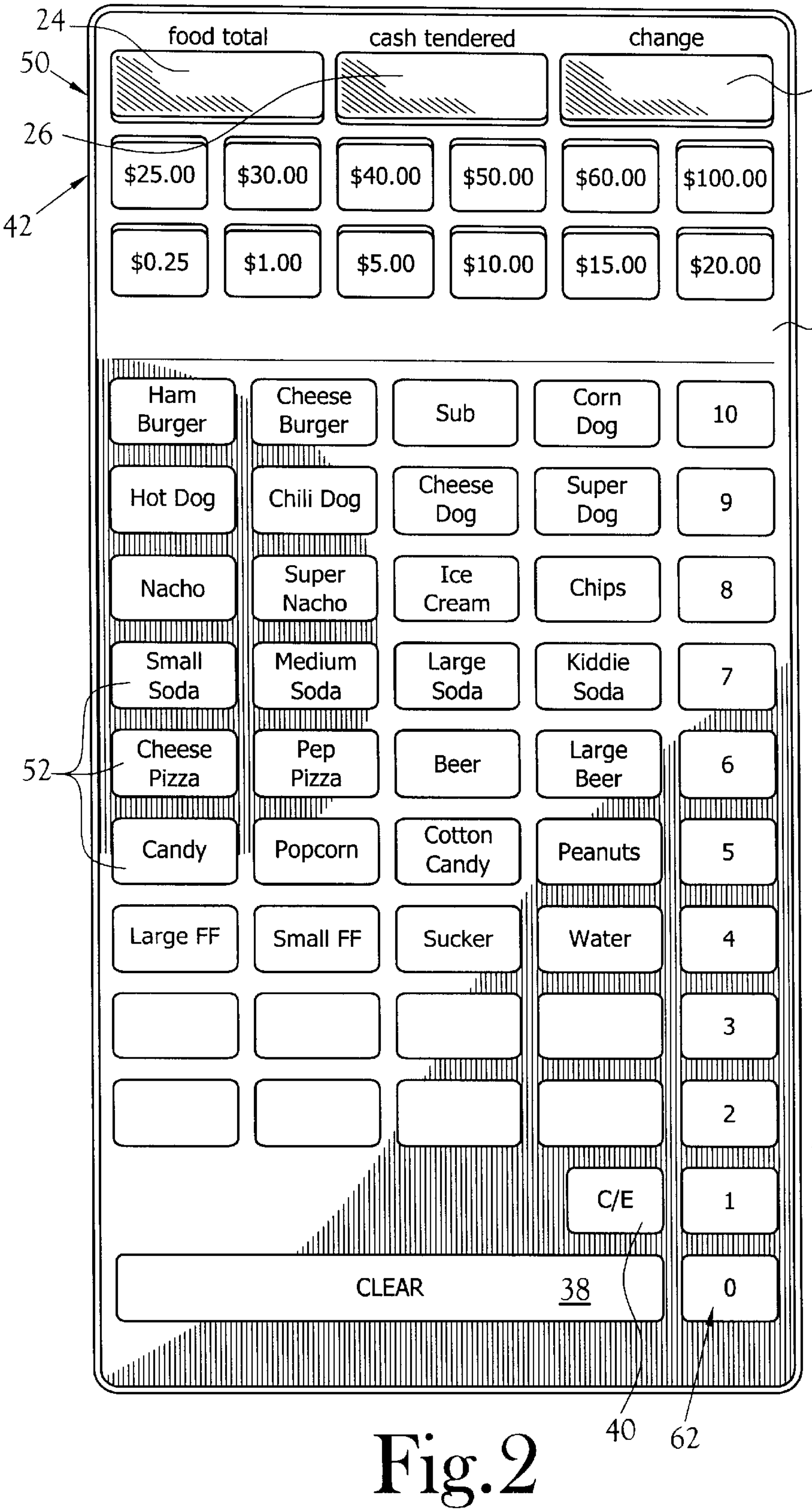
FIG. 2 is a front view of an alternative embodiment of the calculator to the present invention.
Figure 4:
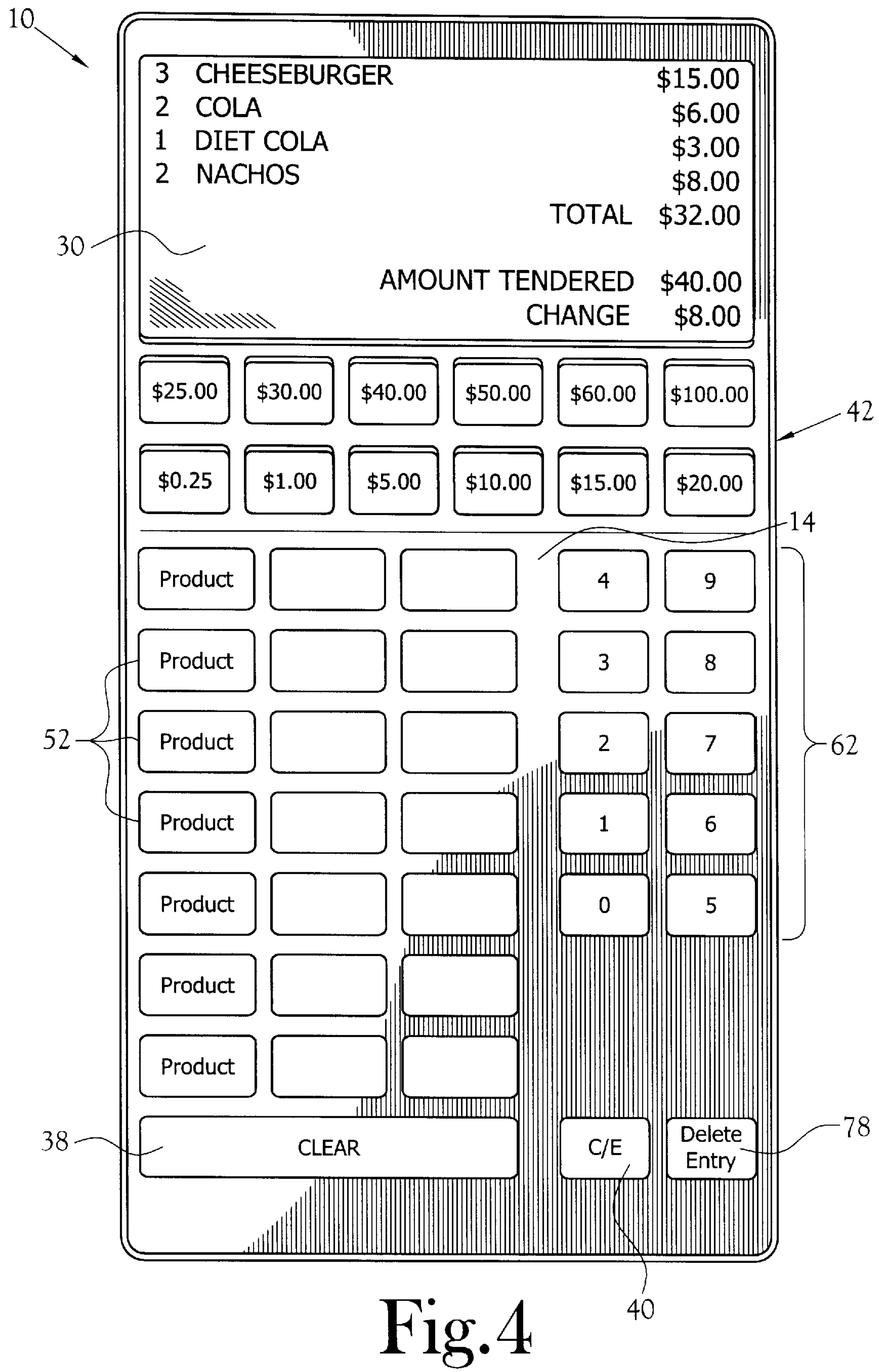
FIG. 4 is a front view of an alternative embodiment of the calculator.

The front surface 14 further includes at least three groups of the plurality of keys 20, arranged in a first group of keys 32 denoting unit value monetary amounts, a second group of keys 42 denoting tendered value amounts, and a third group of keys 62 denoting numeric multiplier keys. Keys having unit values thereon are illustrated in FIG. 1. Keys having descriptive item names thereon are illustrated in FIGS. 2 and 4. The unit values or descriptive item names are removably marked on each key for ease of updating. An alternative embodiment provides a pliable keyboard cover fitting over each key (not shown), or individual key covers (not shown) covering each group of keys, to facilitate changes in unit values or descriptive item names when the concessions calculator 10 is utilized at different entertainment events, and/or at different venues.

A second group of keys 42 on the keyboard 18 includes a plurality of tendered value amounts marked on each respective key (see FIGS. 1, 2 and 4). The tendered value marked on each one of the second group of keys 42 includes currency values ranging from a lower amount, for example, $0.05 or $0.25, up to an upper amount, for example, $50.00 or $100.00, or larger. The tendered value associated with each one of the second group of keys 42 is easily updated, with appropriate reprogramming of the math processor unit 54, to allow the concessions calculator 10 to be utilized for a number of different types and price ranges of merchandise sold.

A third group of keys 62 on the keyboard 18 includes a plurality of numeric multiplier keys ranging from a lower limit to an upper limit. In the illustrated embodiments, the limits are from zero to ten (see FIGS. 1 and 2), or from zero to nine (see FIG. 4). The plurality of numeric multiplier keys are manipulated by the operator in a sequence of keystrokes including manipulation of a numeric multiplier key in series with a manipulation of at least one of the unit value keys 32, or manipulation of a numeric multiplier key in series with a manipulation of at least one of the tendered value keys 42. The instantaneous transaction value is computed and displayed after each sequence of manipulations of one numeric multiplier key and one of the unit value keys 32, and after each series of manipulations of one numeric multiplier key and one of the tendered value keys 42. An addition, subtraction, multiplication, or division key is not provided with the plurality of keys. An operator is not required to manipulate an additional one or more keys to obtain a transaction value, thereby providing simplified operation of the concessions calculator 10 for the time-critical transactions required for concessions sales.

A fourth group of keys positioned on the keyboard 18 includes a key 38 for clearing all transactions, and a key 40 for clearing the last entry. Additional keys are included in the fourth group of keys, such as a key for deleting a prior unit value entry 78 (see FIG. 4), and/or a key for retrieving the last transaction value (not shown), to provide an operator with a minimum number of keys and key strokes for verifying the merchandise items and the instantaneous transaction value of each concessions sale, as displayed in one or more display windows 24, 26, 28, 30. As an example, if an operator has keyed in four items and the buyer changes the order to three items, the operator can manipulate the delete entry key 78 (see FIG. 4), then manipulate a unit value key 32 or the descriptive item key 52 (see FIGS. 2 and 4), for removal of one item from the instantaneous transaction value. The fourth group of keys does not include a function key for addition, subtraction, multiplication, or division, due to an automatic and instantaneous addition sequence that the math processor unit 54 completes each time one of the numeric multiplier keys 62 and one of the unit value keys 32 are manipulated, for computation of each transaction value total. The math processor unit 54 further calculates the subtraction of the computed tendered value from the transaction value each time one of the numeric multiplier keys 62 and one of the tendered value keys 42 are manipulated.

An alternative embodiment (see FIG. 2) includes a display portion 50 having a first display window 24 for display of a subtotal for merchandise ordered and/or the transaction value, a second display window 26 for display of a subtotal of tendered value received by the vendor, and a third display window 28 for display of the monetary 14 amount of change to be delivered to the purchaser. An alternative embodiment of the display window includes a single display window 30 having at least two sections for display of itemized units of merchandise ordered by the customer, with prices displayed as a total transaction value, along with a total of units ordered, a total of amount tendered, and the change owed by the operator (see FIG. 4). An alternate embodiment for the first group of keys 32 (see FIG. 1) includes a plurality of descriptive item keys 52 (see FIG. 2) denoting individual food products or merchandise offered for concession sales.

The concessions calculator 10 includes a means for computing of the transaction value after each manipulation of the plurality of keys. The means for computing provides computation of the transaction value absent additional keystrokes by the operator. The means for computing includes at least one math processor unit 54 and connecting circuitry within the housing 12, and includes a plurality of memory registers 58 (see FIG. 5) associated with the at least one math processor unit 54. The plurality of memory registers and at least one math processor unit 54 operates with an electronic processing format known to those skilled in the art. An individual unit value equal to the monetary amount associated with each respective key is stored in the plurality of memory registers 58. An example includes a unit value key identified for a "hot dog" purchase, which would be associated in one of the memory registers with a specified price for the hot dog programmed into memory with the math processor unit 54. Each unit value is retrieved from each respective one of the memory registers 58 as one or more unit value keys 32 are manipulated by the operator. The math processor unit 54 includes software for automatic computation of an instantaneous addition sequence that the math processor unit 54 completes each time one of the numeric multiplier keys 62 and one of the unit value keys 32 are manipulated. Therefore, the total of the transaction value is computed and displayed for the operator without the operator having to manipulate an addition key, a subtraction key, or a unit value summation key.

The plurality of memory registers 58 includes a first memory register 34 for storage of the last unit value key manipulated by an operator for a partial order placed by a customer (see FIG. 5). At least one unit value summation register 36 is included for storage of the unit value summation computed by the math processor unit 54. A sequential manipulation by the operator of one or more numeric keys 62 (example, 11 items ordered), followed by manipulation of one or more unit value keys 32 or 52 (example, 11 hot dogs ordered), are stored in the first memory register 34, computed by the math processor unit 54, and stored in the unit value summation register 36 without the operator having to manipulate an addition or subtraction key. The unit value summation of the customer's order stored in register 36 is compared by the math processor unit 54 with a tendered value entered by the operator, for computation of the change due to the customer without the operator having to manipulate an addition or subtraction key. The summation of the unit value of the order placed by a customer is displayed in a first display window 24. In the embodiment of FIG. 4, the summation of the unit value of the customer's order is displayed as an itemized order in a portion of display window 30. An alternative embodiment provides for a programable math processor unit 54 for reprogramming of the monetary values associated with each key as stored in memory registers 58 associated with the math processor unit 54, when the hand held calculator 10 4 is utilized with the sale of various types of concessions at different events. Programable math processor unit 54 includes an interface 80 for connection to a reprogramming tool such as a computer for transfer of updated information to calculator 10.

The plurality of memory registers 58 includes an additional memory register 44 for storage of an incremental tendered value, and at least one register 46 for storage of a tendered value summation. The stored tendered value summation is obtained by manipulation of a sequence of numeric keys 62 and tendered value keys 42, with storage in register 46, and use in calculating by math processor unit 54 of a change value displayed in window 26 or 28 (see FIGS. 1 and 2), or in display window 30 (see FIG. 4). For multiple manipulations of the numeric keys 62, a numeric multiplier register 64 is included in the plurality of memory registers 58 (see FIG. 5).

A method of computation and display of instantaneous transaction values for concession sales by an individual operator is disclosed. The method uses a hand held calculator as described herein. For input of a transaction for concessions sales, the steps accomplished by an operator include manipulating a numeric key 62 followed by manipulating at least one unit value key 32 (see FIG. 1) or descriptive item key 52 (see FIG. 2). A total of the unit value or descriptive items ordered are displayed in one of the display windows 22, 24 or 30. For input of a tendered value, the steps include manipulating a numeric key 62 followed by manipulating at least one tendered value key 42. A total of the tendered value is displayed in one of the display windows 26 or 30. The math processor unit 54 computes the difference between the tendered value total, and the unit value total, for display in window 26, 28 or 30 of the change due to the purchaser. The math processor unit 54 does not compute a running tally for total sales.

The portable calculator provides for a low cost system for computation and display of each instantaneous transaction for use by a mobile vendor, or by a concessions vendor for use in a vendor booth. While numerous embodiments are illustrated and described, it will be recognized that alternative embodiments of the disclosed invention may be employed without departing from the spirit and the scope of the invention as set forth in the appended claims. Further, the disclosed invention is intended to cover all modifications and alternate methods falling within the spirit and the scope of the invention as set forth in the appended claims.

Having thus described the aforementioned invention, I claim:

1. An apparatus for computation and display of an instantaneous transaction value between a vendor and a customer, said apparatus comprising:

a housing adapted to be handheld by an operator;

a keyboard on said housing, said keyboard having a plurality of keys thereon, said plurality of keys separated into at least a first group of keys representing a plurality of unit price values and a second group of keys representing a plurality of tendered values;

a math processor in communication with at least said first group of keys and said second group of keys, said math processor computing a transaction value from input from said first group of keys, said math processor computing a tendered value from input from said second group of keys, and said math processor computing a change due value from a comparison of said transaction value and said tendered value;

a first display for displaying said transaction value;

a second display for displaying said tendered value; and a third display for displaying said change due value representing an amount of change due to the customer from the vendor.

2. The apparatus of claim 1, further comprising at least a third group of keys representing a plurality of quantity values.

3. The apparatus of claim 2, wherein said math processor is in communication with said third group of keys, said math processor requiring at least one input from each of said first group of keys, said second group of keys, and said third group of keys for computing said transaction value, said tendered value, and said change due value.

4. A handheld apparatus for computation and display of an instantaneous transaction value between a vendor and a customer, said apparatus comprising:

means for entering at least one unit price value;

means for entering at least one tendered value;

means for calculating a transaction value;

means for calculating a change due value from a comparison of said at least one unit price value and said at least one tendered value; and means for displaying said at least one price value, said at least one tendered value, said transaction value, and said change due value.

5. The handheld apparatus of claim 4, further comprising a means for entering a plurality of quantity values, said means for entering in communication with said means for calculating said transaction value and said means for calculating said change due value.

6. The handheld apparatus of claim 5, each of said means of entering including a keyboard having a plurality of keys thereon, said plurality of keys separated into at least a first group of keys representing a plurality of unit price values, a second group of keys representing a plurality of tendered values, and a third group of keys representing a plurality of quantity values.

7. The handheld apparatus of claim 6, wherein said means for calculating said transaction value includes a math processor for computing said transaction value from a comparison of said at least one unit price value and said quantity value, thereby calculating said transaction value, and said means for calculating said change due value includes said math processor for computing said change due value from a comparison of said at least one tendered value and said transaction value.

8. The handheld apparatus of claim 7, wherein said means for displaying including: a first display in communication with said math processor for display of an itemization of said at least one unit price value; a second display in communication with said math processor for display of said at least one tendered value and said transaction value; and a third display in communication with said math processor for display of said change due value.

9. The handheld apparatus of claim 8, wherein said means for calculating further includes a memory means including a plurality of memory registers having:

at least one unit value memory register for storage of at least one unit price value for said comparison with said tendered value;

at least one transaction memory register for storage of said transaction value; and at least one summation memory register for storage of said change due value.

10. A method for calculating and displaying on a handheld calculator an instantaneous transaction value and a change due value for a transaction between a vendor and a customer, said method comprising the steps of:

a) entering a unit price value and a quantity of units for each unit price value;

b) displaying said unit price value and said quantity of units for each unit price value;

c) calculating a transaction value using a means for calculating;

d) displaying said transaction value;

e) entering a cash tendered value;

f) displaying said cash tendered value;

g) calculating a change due value using said means for calculating; and h) displaying said change due value.

11. The method of claim 10, wherein said steps of calculating a transaction value and a change due value further comprise the steps of:

a) multiplying said unit price value with said quantity of units utilizing said means for calculating to produce said transaction value;

b) comparing said transaction value with said cash tendered value utilizing said means for calculation; and c) calculating said change due value for displaying said change due value.

12. The apparatus of claim 1 wherein said first display, said second display, and said third display are each separate display components.

13. The apparatus of claim 1 wherein at least one of said first display, said second display, and said third display is separate from the others of said first display, said second display, and said third display.

14. The apparatus of claim 1 wherein said first display, said second display, and said third display are portions of a single integrated display unit.

* * * * *